Inventors.
Willy Lohs, &
Walter Paul.
By [signature] Atty.

March 6, 1956    W. LOHS ET AL    2,737,648
IMPULSE-STORING DEVICE FOR USE IN SIGNALLING SYSTEMS
Filed Sept. 2, 1952    9 Sheets-Sheet 2

Inventors.
Willy Lohs, &
Walter Paul.
By

Fig 3

March 6, 1956 W. LOHS ET AL 2,737,648
IMPULSE-STORING DEVICE FOR USE IN SIGNALLING SYSTEMS
Filed Sept. 2, 1952 9 Sheets-Sheet 4

Fig.6

March 6, 1956 W. LOHS ET AL 2,737,648
IMPULSE-STORING DEVICE FOR USE IN SIGNALLING SYSTEMS
Filed Sept. 2, 1952 9 Sheets-Sheet 6

Inventors.
Willy Lohs, &
Walter Paul.
By ~~~ Atty.

March 6, 1956 — W. LOHS ET AL — 2,737,648
IMPULSE-STORING DEVICE FOR USE IN SIGNALLING SYSTEMS
Filed Sept. 2, 1952 — 9 Sheets-Sheet 8

Inventors.
Willy Lohs, &
Walter Paul.

March 6, 1956   W. LOHS ET AL   2,737,648
IMPULSE-STORING DEVICE FOR USE IN SIGNALLING SYSTEMS
Filed Sept. 2, 1952   9 Sheets—Sheet 9

Inventors.
Willy Lohs, &
Walter Paul.

United States Patent Office 2,737,648
Patented Mar. 6, 1956

2,737,648

IMPULSE-STORING DEVICE FOR USE IN SIGNALLING SYSTEMS

Willy Lohs, Berlin-Siemensstadt, and Walter Paul, Munich, Germany, assignors to Siemens & Halske Aktiengesellschaft, Munich, Germany, a corporation of Germany Application September 2, 1952, Serial No. 307,504

Claims priority, application Germany September 6, 1951

39 Claims. (Cl. 340—347)

This invention is concerned with switching devices for storing series of impulses in signalling systems, especially automatic telephone systems. The invention is applicable, e. g., to impulse repeaters, and may be considered an improvement on known impulse-storing devices in which an electrically testing feeler or scanning wiper is adjusted relative to mechanically moved storing members so as to determine the end of impulse series.

The object of the invention is to provide a switching device having simple means for uniting mechanically operated storing members or contacts to form a structural unit with an electrically testing feeler or scanning element.

The switching device according to the invention comprises a set of contact members forming storage contacts, which are disposed radially and rotatably about the switch axis and a fixedly disposed annular member, the contact members for numerals which are not stored being disposed on one side of said annular member and the contact members on the other side thereof being in storage position into which they are brought through a cutout formed in the annular member. A metallic connection between a contact member and the feeler or scanning wiper for the testing circuit, which signifies the termination of an impulse series, is accomplished only in such storage position of a contact member. The feeler or scanning wiper, which is set together with the storage contact members, is restored to normal position in step-by-step manner under the control of actuating means which are governed by a restoring spring, such spring being tensioned incident to the setting of the feeler and of the contact members and being freed for the actuation of the operating means by a control magnet to cause the operating means to execute the step-by-step restoring motion of the scanning wiper. A uniform restoring motion of the scanning wiper is in this manner obtained by a device operating similar to an escapement which comprises an oscillatable operating arm acting upon a double-armed lever having pawl-like ends which alternately engage the teeth of a gear wheel.

The uniform restoration of the scanning wiper, and therewith uniform impulsing, may also be secured by moving a stepping pawl of simple structure in the direction of the switch axis and by arranging for the coaction of the stepping pawl and the control magnet centrally of the switch axis.

The contacting of the scanning wiper with contact members in storage position thereof at any position of the fixedly disposed annular member may be secured by forming on the annular member guideways or slideways along which the scanning wiper can slide into and out of storage position.

The various objects and features of the invention will be brought out in the course of the detailed description which will presently be rendered with reference to the accompanying drawings showing in diagrammatic manner embodiments of impulse repeater switches in which series of impulses are stored and retransmitted at instants independent of the time of storing, the number of impulses which are to be retransmitted in any impulse series being determined by a scanning wiper which electrically tests the contact members which have been brought into storage position. In the drawings.

Referring now to Figs. 1–5, the device shown in these figures comprising a die-cast frame 6 carrying an annular member 5 which is insulated from the frame so that there is no metallic connection therebetween. The annular member 5 is provided with cutouts 5' and 5" which are particularly apparent from Figs. 1 and 3.

Rotatably journalled on the switch shaft 2 is a bushing 32 which carries a gear wheel 9 and the contact disk 1 having the storage contacts 3 which extend therefrom radially as shown. These storage contacts are made in the form of elastic or resilient fingers. The bushing 32 also carries the gear wheel 13a.

A stepping pawl 8 (Fig. 3) extends from the armature 7 of the magnet D and engages the gear wheel 9. A detent 31 is mounted on the housing 6 to control the advance of the gear wheel 9 by the pawl 8, responsive to energization of the magnet D.

A magnet M having an armature 4 (Figs. 1, 3, and 4) is provided for operating the storage contacts 3 from their normal to their actuated positions.

A spring 19 is provided (Fig. 2) which has the inner end connected with the shaft 2, while the outer end is journalled in the associated spring casing. This casing is fixedly connected with the bushing 13 which in turn is rotatable on the shaft 2. Also fixedly coupled with the bushing 13 is the switch arm carrier 12 which supports the scanning wiper 20/11 and the current-supply wiper 22. Rotatably journalled on the carrier 12 is the double-armed pawl 14 and the actuating lever 17. The current-supply wiper 21 slides in engagement with the segmental terminal 22 which is mounted on the frame 6.

Figure 1:
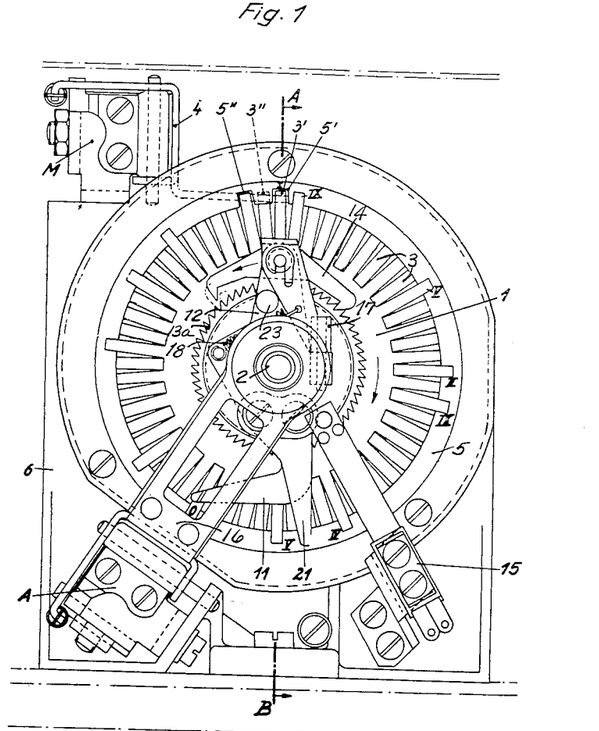
Fig. 1 illustrates an embodiment of an impulse repeater as seen from the side thereof, on which is disposed the scanning wiper.

The opposite ends of the double-armed lever 14 are formed in the manner of pawls for engagement with the gear wheel 13a. The actuating lever 17 is controlled by the armature 16 of the magnet A. The armature 16 is at its free end funnel-shaped. This funnel-shaped end of the armature extends over the bushing 13 which is journalled rotatably on the shaft 2, as is particularly apparent from Fig. 2. The switch arm carrier 12 also is provided with a switching pin 23 which actuates the contacts in the contact pile 15 in the normal or resting position of the device. Secured upon the switch arm carrier 12 is one end of the spiral spring 18 (Fig. 1). The other end of the spring 18 is hooked into the actuating lever 17 and biases it in clockwise direction.

The operation of the device is as follows:

The magnet M is deenergized in the normal position of the device, and the armature 4 therefore is in resting or normal position. The storage element or contact 3' disposed in the cutout 5' of the annular member 5 is brought into storage position by the armature 4 of the magnet M, as is apparent from Figs. 2 and 4.

Figure 2:
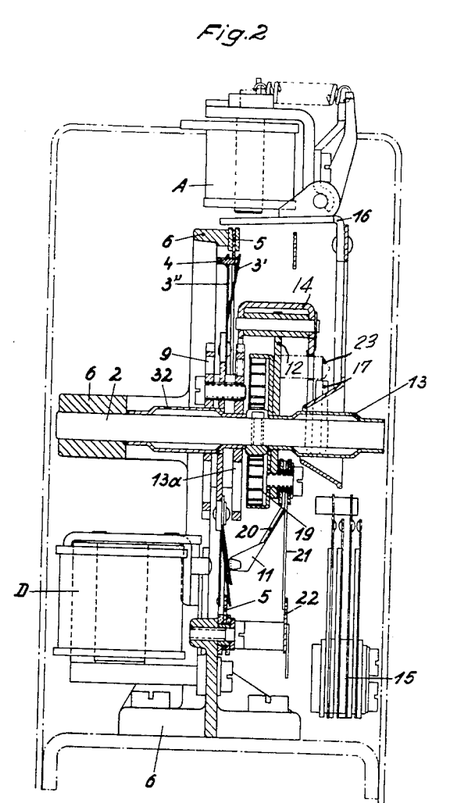
Fig. 2 shows a sectional view of the device of Fig. 1 as seen along line A—B thereof. The magnet A and its armature 16 are not shown in Fig. 2 in the true position, corresponding to Fig. 1, but are for convenience displaced clockwise by 150° from the position in which they are shown in Fig. 1. The contact pile 15 is for similar reasons shown in Fig. 2 in a position displaced counterclockwise by 30° from the position in which it is shown in Fig. 1.
Figure 3:
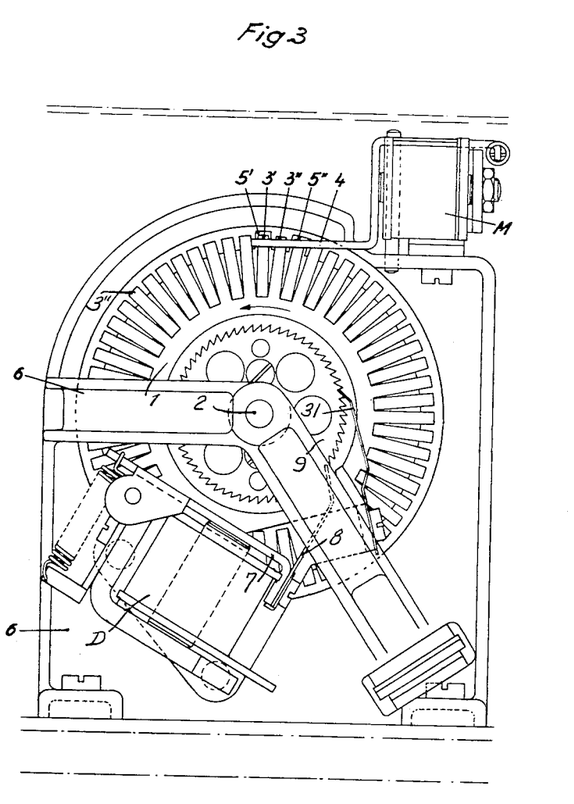
Fig. 3 shows the storage device of Figs. 1 and 2 from the storage contact side thereof. The drive magnet D of Fig. 3 is represented in Fig. 2 in a position displaced counterclockwise by 30° from its true position in which it is indicated in Fig. 3.
Figure 4:
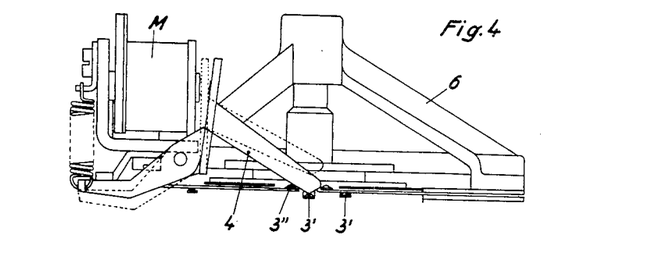
Fig. 4 is a partial top view of the impulse repeater and illustrates the mechanical control of the storage contact members 3 by the magnet M and its armature 4.

The rotary magnet D shown in Figs. 2 and 3 receives, over suitable circuit means, the impulse series which are to be stored. In accordance with the received number of impulses, the armature 7 actuates its pawl 8 and therewith operates the gear wheel 9 in the direction of the arrow shown in Fig. 3. The storage contact disk 1 with its storage contacts 3 and the gear wheel 13a (Figs. 1 and 2) being rigidly coupled with the gear wheel 9, take part in its rotation. Incident to the first step of the storage disk 1, the storage contact 3' slides off the end of the armature 4 and slides along the annular member 5 on the storage side thereof. Coincident with the first current impulse of the transmitted series of impulses, the magnet M is switched in by a suitable circuit means and puts the armature 4 in operated position so that for the time being no further storage contacts will be actuated by the armature 4 of the magnet M. In accordance with the number of impulses received, a certain storage contact 3' will then be in alignment with the cutout 5' of the annular member 5 (Figs. 1, 3 and 4). Upon termination of the series of impulses, the magnet M will deenergize and its armature 4 will be brought into resting position by spring power. The storage contact is in this manner bent through the cutout 5' to the storage side of the annular member 5.

It may be mentioned at this point that the circuit means for operating the magnet D as well as the magnet M, as above described, and also other circuit means which will be hereafter mentioned, are generally known and have therefore been omitted in order to avoid unnecessarily encumbering the drawings. It is believed, since such circuit means and expedients are generally known to those versed in the signalling art, that anyone experienced in this art will be able to provide them.

Now, when the rotary magnet D receives the second series of impulses, the gear wheel 9 with the storage contact disk 1 will be rotated into a position which corresponds to the second series of impulses. Coincident with the first rotary step of the second series of impulses, the storage contact 3', which designates or signifies the number of the current impulses of the first series of impulses, will slide off the end of the armature 4 of the magnet to the storage side of the annular member 5. The magnet M then again receives an impulse, so that the attracted armature 4 does not touch the storage contacts which glide past the cutout 5'. Only when the second series of impulses is concluded and when the magnet M becomes accordingly deenergized will the armature 4, which returns to its normal position, press the storage contact which corresponds to the second series of impulses through the cutout 5' into its storage position. Further impulses received operate the device in similar manner.

Fig. 1 shows the storage contact O in storage position. The scanning wiper 11 is in the same position. Roman numerals V, IV, IX, II, V, IX, I designate further storage contacts which are in storage position. The number of current impulses in a series of impulses is determined by the number of storage elements which are disposed between two storage contacts that have been brought into storage position. In the example assumed in Fig. 1, the device therefore has received first the number "5" and then the number "4," and thereafter successively the numbers "9," "2," "5," "9" and "1."

The re-transmission of the stored numbers can take place at any desired time. The gear wheel 13a is, as already mentioned, rigidly coupled with the storage contact disk 1 and with the gear wheel 9. The rotary motion, which is executed by the gear wheel 9 and by the storage contact disk 1 incident to the receipt of the current impulse series, therefore is also followed by the gear wheel 13a. A coupling is provided between the gear wheel 13a and the lever 14 (Fig. 1). This coupling causes the switch arm carrier 12 with the scanning wiper 20/11 to execute the same rotary motion, and the switch arm 11 therefore is advanced to the storage contact O. The housing encasing the spring 19 is likewise rotated by the rotation of the switch arm carrier 12 for tensioning the spring 19.

The restoration motion of the scanning wiper 11 takes place as follows: The magnet A receives in suitable manner over suitable circuit means current impulses signifying that the restoring motion should take place. The magnet A can be controlled and governed in any desired and suitable manner, e. g., by a suitable relay interrupter or by a self-interrupter circuit, which has been omitted from the drawings because such circuits and interrupters are generally known. Each current impulse which affects the magnet A is also in suitable manner transmitted to the control or switching devices which are to be set by the re-transmission of the impulse series responsive to the operation of the impulse repeater. These switching devices, which receive the retransmitted impulses, have been omitted for the same reasons as already explained, namely, to avoid unnecessarily encumbering the drawings, because such switching devices do not form part of the invention, and the circuit means by which the retransmitted impulses actuate such devices are generally known.

The armature 16 of the magnet A is attracted responsive to the first impulse, and the funnel-shaped end of this armature (Fig. 2) executes a motion from right to left about the switch axis. The operating lever 17 (Fig. 1) is rotated about its axis by this actuation of the funnel-shaped end of the armature 16. The operating lever 17 is thereby moved away from the center point of the axis of the shaft 2. The right pawl of the double-armed lever 14 is by the actuation of the lever 17 moved away from the gear wheel 13a. Due to the fact that the spring 19 (Fig. 2) is tensioned, the switch arm carrier 12 with the pawl 14 will execute a rotary motion to the left until the left pawl of the lever 14 engages the next tooth of the gear wheel 13a.

When the magnet A deenergizes, the armature 16 will be restored to normal position. The restoring spring 18 (Fig. 1) pulls the lever 17 in the direction of the axis of the shaft 2. The left pawl of the lever 14 leaves the root of the corresponding tooth of the gear wheel 13a. The right pawl of the lever 14 engages the next tooth. During this motion of the lever 14 the switch arm carrier 12 will again execute a rotary motion to the left until the right pawl of the lever 14 is in engagement with the flank of the next tooth of the gear wheel 13a.

The switch arm carrier 12 will be rotated retrogressively by one step in two switching increments by the attraction and restoration of the armature 16 of the magnet A. The scanning wiper 11, which is fixedly connected with the switch arm carrier 12, has left the storage contact O and is in this manner rotated by one step to the right.

These operations are repeated when the magnet A receives current again. The scanning wiper 11 executes the second step. When the scanning wiper 11 reaches the contact V, which happens responsive to the fifth current impulse which affects the magnet A, a circuit will be completed over the annular member 5, the storage contact V, scanning wiper 11, switch arm 21 of the current supply and the current-supply segment 22, which circuit will control a suitable relay means (not shown) which, in any suitable and desired manner, interrupts the actuation of the magnet A for a certain time and which at the same time terminates the impulsing caused by the control means for the magnet A. Any suitable and desired relay means and associated circuit means may be employed to bring about the above-noted operations.

When the magnet A receives the signal for transmitting the second impulse series, the scanning wiper 11 will, coincident with the step-by-step operation of the magnet A, rotate to the left in the above described manner until the scanning wiper has reached the storage contact IV. The magnet A is energized four times by the stepping of the scanning wiper from the contact V to the contact IV, and a corresponding series of impulses, comprising four impulses, is thereby transmitted.

Responsive to further successive return motion of the scanning wiper and coincident transmission of the corresponding stored impulse series (digits 9, 2, 5, 9, 1) the scanning wiper 11 will reach the storing contact I and the switching pin 23 (Fig. 2) will have actuated the contacts 15 to their operated position. The contacts 15 close a circuit for transmitting a signal which signifies that all impulse series received by the storage device have been transmitted.

The return of the storage contacts from their storage position (the storage contact is according to Fig. 2 disposed on the right side of the annular member 5) is accomplished as follows:

As already described, the gear wheel 9 and the storage disk 1 (as shown in Fig. 3) is rotated to the left incident to the receipt of the impulse series by the magnet D. The storage disk 1 (Fig. 1) then is rotated to the right and the corresponding storage contacts 3 are, after each impulse series, brought into the corresponding storage position. When a storage contact, which is in storage position, is incident to this operation brought into alignment with the cutout 5″, this storage contact will by its resilience flex through the cutout 5″ and, after further stepping, will come to lie in back of the annular member 5. The corresponding position of such a contact is indicated in Fig. 1 by 3″. The storage contact therefore has reached a position from which it can be brought into storage position only if it comes to stand at the end of an impulse series in front of the cutout 5″ and when the armature of the magnet M switches the contact into the storage position.

In Fig. 4 is shown another embodiment of the storage contact and its control. In the embodiment shown in Fig. 2 there is, between the storage contact 3 in its resting position (left of the annular member 5) and the contact 3″, which is brought into storage position, slides with its pitted end upon the storage side of the annular member 5. On the other hand, in Fig. 5 the storage disk 1 is disposed in the plane of the annular member 5 in which is also disposed the contact 3″. The storage contacts of nonstored numbers slide in this case upon the upper side of the annular member 5. When the contact 3 reaches the cutout 5″ responsive to rotation of the storage disk, the contact will slide off the left slide and gilde surface of the annular member 5 and will take the position underneath the free end of the armature 4 of the magnet M. If the storage contact 3″ is not brought into storage position by the armature 4, it will glide over the right guide and slide surface onto the upper side of the annular member 5. But, if the contact 3″ is pressed by the armature into the storage position, it will, responsive to the successive step of the storage disk 1, glide along the underside of the annular member into the storage position.

Figure 5:
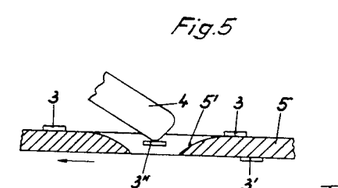
Fig. 5 indicates a modified embodiment of the storing members.

The embodiment shown in Fig. 5 has the advantage that the storage disk 1 with its smooth storage contacts and the annular member 5 are not affected only on one side.

Figure 6:
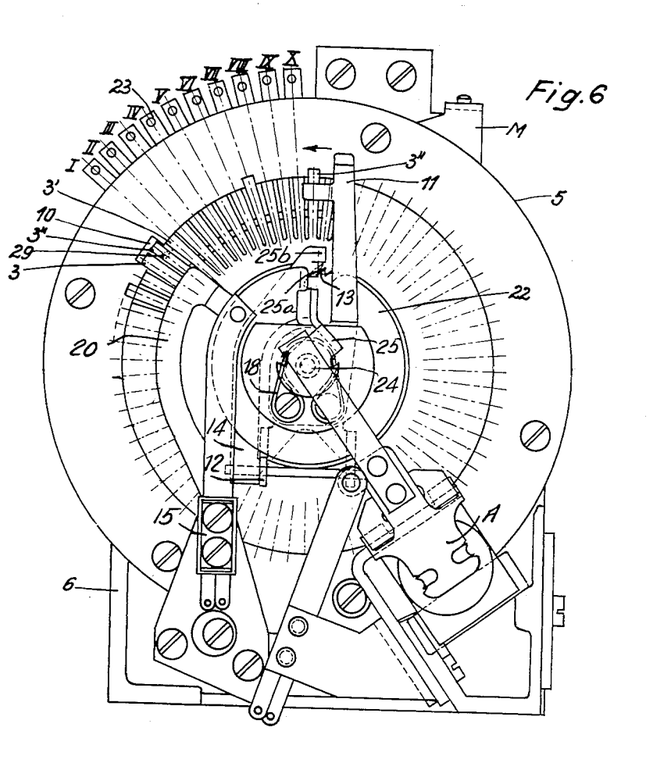
Fig. 6 illustrates another embodiment of an impulse repeater device from the side thereof on which is disposed the scanning wiper.
Figure 7:
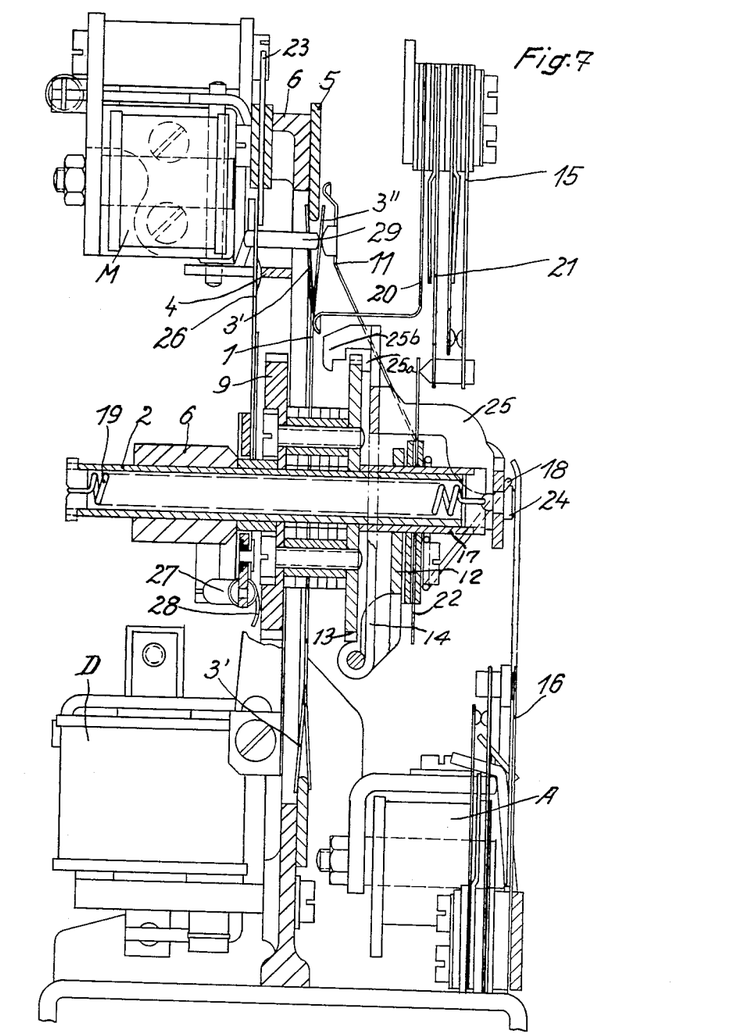
Fig. 7 is a sectional view of the embodiment Fig. 5.
Figure 8:
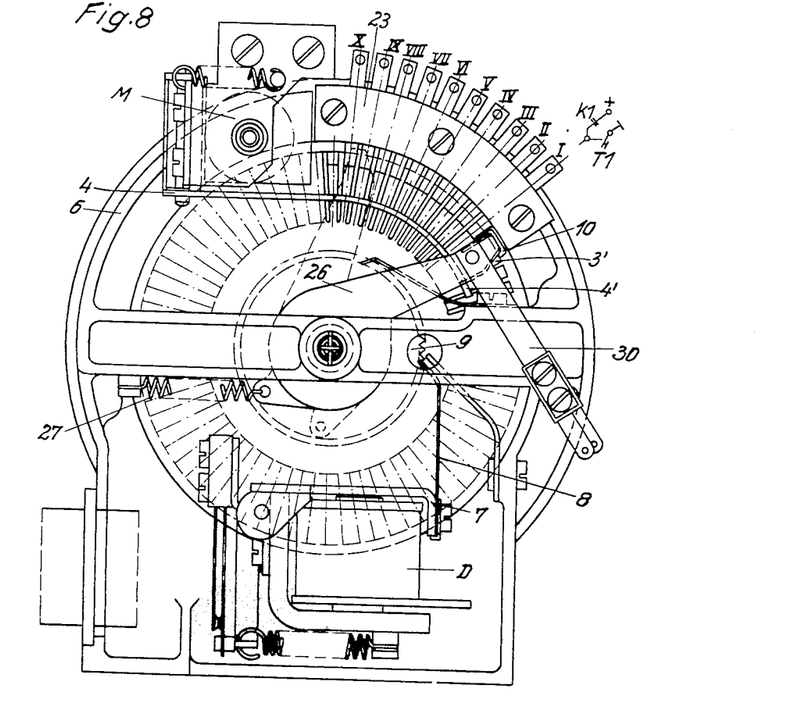
Fig. 8 shows the structure of Figs. 6 and 7 from the storage contact side thereof.

The switching device according to Figs. 6–9 comprises a frame 6. Upon the circular part of the frame 6 is disposed an annular guide member 5 made of insulating material. The storage disk 1 is provided with radially extending storage contacts 3, of which the contacts indicated by 3′ are on one side (left as shown in Fig. 7) of the annular guide member 5, while the contacts indicated by 3″ are disposed on the other side (right as shown in Fig. 7) of the annular guide member 5. The storage disk 1 is rotatably journalled upon the hollow shaft 2 of the switch. The stepping gear wheel 9 and a detent wheel 13 are fixedly connected with the storage disk 1. The stepping gear wheel 9 is actuated by the pawl 8 which is connected with the armature 7 of the magnet D, as is particularly apparent from Fig. 8. Upon the shaft 2 of the switching device is journalled the testing or scanning arm 26 so as to be rotatable thereon as well as movable axially thereof (Figs. 7 and 8). The axial motion of the testing or scanning arm 26 takes place about the pivot point provided by the member 28. The restoring spring for the arm 26 is indicated by numeral 27. Upon the circular portion of the frame 6, upon the storage side thereof (Fig. 8), is fastened a contact segment 23 having contacts which are indicated by I–X. The testing and scanning arm 26 slides over this segment 23. In the resting or normal position of the switching device, the contact set 30 is switched into the operating position by the testing arm 26. This arm is provided with a switching pin 29 which actuates the storage contact 34 into the storage position as a time when the arm 26 is in the position in which it is shown in Fig. 7.

Secured to the frame 6 of the switching device is also the magnet M having an arcuate armature 4 which is adapted to lift the testing or scanning arm 26 from the contact set 23. The arm 26 rotates incident to this operation about its pivot 28.

Upon the hollow shaft 2 of the switching device is journalled the bearing bushing 17. Upon this bushing 17 is secured the carrier 12 for the lever 14 having the pawl 25 and the scanning wiper 11 with its associated current-supply segment 22. The spring 18, the ends of which engage the cutouts in the pawl 25, as particularly shown in Fig. 6, presses the pawl 25 outwardly as shown in Fig. 7. The pawl 25 is provided with a member 24 which is disposed at the center point of the axis of the shaft 2. Secured to the member 25 is one end of the spring 19 which is disposed within the bore of the shaft 2. The pawl 25 with its lever 14 is rotatably journalled upon the carrier 12. The pawl 25 has the two sliding surfaces 25a and 25b which engage the teeth of the detent wheel 13. The magnet A is secured to the switch frame 6, the magnet being shown in Fig. 7 rotated by 36° from its true position. The armature 16 actuates the stepping pawl 25. A contact set 15 is mounted on the switch frame 6, this contact set also comprising the current-supply spring 50 for the storage disk 1 and the current-supply spring 21 for the scanning wiper 11. These parts are shown in Fig. 7 displaced by 180° from their true positions.

Connected to the individual contacts I–X of the contact segment 23 shown in Fig. 8 are condensers which are charged in a suitable circuit responsive to actuation of a key or keys included in the circuit. Fig. 8 shows only the condenser K1 with its associated key T1 for the contact I. Similar keys and condensers are provided for the remaining contacts II–X.

The operation of the switching device or impulse sender according to Figs. 6–9 is as follows:

Actuation of a key such as T1, which corresponds to a number that is to be stored, will cause charging of the associated condenser. The charged condenser forms the potential for determining the storage contact which corresponds to the number to be stored. The electrical marking at the contact set 23 can of course take place by suitable relay contact means provided in place of the key means shown.

It shall be assumed that the numbers "4" and "7" are to be stored. Accordingly, the contacts IV and VII of the contact set 23 are placed under certain potentials by the actuation of the associated keys.

The contact 30 shown in Fig. 8 is actuated when the first key is depressed, and the magnet D thus receives current impulses over a suitable circuit means (not shown). The stepping pawl 8 rotates the stepping gear wheel 9. The storage disk 1, the gear wheel 13, the pawl 25 and the carrier 12 with its scanning wiper 11 rotate with the gear wheel 9. The switching pin 29 has held the storage contact 3″ in storage position, as shown in Fig. 7. The switching pin 29 is, by the rotation of the storage disk 1, carried along by the contact 3′ engaging the shaft of the pin 29, and the rotation of the storage disk 1 is thus transmitted to the testing or scanning arm 26 over the switching pin 29. The springs 27 and 19 are tensioned. When the testing arm 26 reaches the control contact IV after four steps, there will result a circuit due to the charged condenser, which is effective to a relay device over the charged contact of the contact set 23 and the testing arm 26, which causes interruption of the drive circuit for the drive magnet D. Suitable and desired known circuit means may be employed for accomplishing this operation. The switching device stops and the magnet M is switched into circuit. The arcuate armature 4, apparent from Fig. 8, lifts the switching arm or wiper 26 from the contact of the contact set 23. The switching pin 29 of the arm or wiper 26 is, incident to this operation, lifted from the storage contact 3″, which remains in storage position, and is pulled out from the storage contact set. After this motion the switching arm 26 is retracted by the action of the spring 27, which has been tensioned during the setting of the switching device, and is placed into its initial position. In this position the switching arm or wiper 26 will lie against the end 4′ of the armature 4.

The magnet M deenergizes and restores its armature 4 to normal position. The switching wiper 26 is thereby caused to re-engage the contact set 23. The storage contact of the storage disk 1, which now stands in alignment with the cutout 10 of the annular member 5, is now brought to the right side of the annular member 5 (Fig. 7) by the switching pin 29 of the arm or wiper 26. This contact signifies the number of current impulses of the first series—in the assumed case, four current impulses.

The contact set 30 is switched into operating position by the switching arm or wiper 26. The switching device is thus prepared for the storage of the next successive digit "7." If the key corresponding to this next successive digit is depressed, the switching device will be stepped to the contact VII and the operations will be repeated; namely, the testing arm or wiper will be restored to its normal position and the corresponding storage contact will be switched into the storage position, as described before.

The stepping speed of the switching device must be great enough to assure that the switching wiper 26 reaches the contact X responsive to the depression of the second key, provided that the contact X has been designated by the depression of the first key. Proper receipt of the digits and also of the succession of several digits by the switching device is thereby secured.

When a contact 3′ reaches in its storage position the cutout 10 of the annular member 5, incident to the rotation of the storage disk 1, this contact will first assume its central position and will then either run upon the left side of the annular member 5 (Fig. 7) or it will be switched into the storage position, provided that the switching pin 29 of the testing wiper 26 stands in front of this contact upon return into its normal position.

Figure 9:
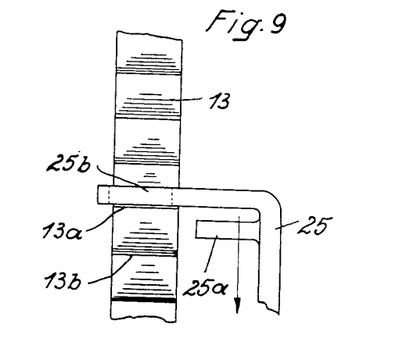
Fig. 9 is a partial view of the stepping pawl of the scanning wiper of the structure illustrated in Figs. 6–8.

When the signal is received for the re-transmission of the stored digits, the magnet A (Figs. 6 and 7) will receive current impulses over suitable circuit means (not shown). The armature 16 will accordingly be lifted from the member 24 of the stepping pawl 25 by the action of the spring 18. The surface 25 will thereby glide along the flank of a tooth of the detent wheel 13 (Fig. 7). When the surface 25a reaches the right margin of the detent wheel 13, the stepping pawl 25 will be rotated until the surface 25b, which is displaced by one-half tooth, lies against the tooth flank. The position which has thus been reached by the pawl 25 is indicated in Fig. 9. The rotation of the pawl 25 is caused by the spring 19 which has been tensioned incident to the setting of the switching device. After the armature 16 of the magnet A restores, the stepping pawl 25 (Fig. 9) will be moved to the left. The surface 25b will thereby slide along the tooth flank 13a. When the end of the surface 25b reaches the left edge of the detent wheel 13, the pawl 25 will execute a further motion in the direction of the arrow, until the surface 25a lies against the tooth flank 13b. The stepping pawl 25 is moved by one step incident to the successive attraction and restoration of the armature 16 of the magnet A. The current impulse acting upon the magnet A is in any suitable and desired known manner transmitted to the concerned switching devices which are to be actuated by the operation of the repeater or impulse transmitter disclosed herein.

The step executed by the stepping pawl 25 is transmitted over the lever 14 and the carrier 12 to the scanning wiper 11. Incident to the first switching step the contact point of the scanning wiper 11 leaves the storage contact 3″ (Fig. 6) and the outer end of the scanning wiper 11 glides along the annular member 5. The scanning wiper 11 therefore has, incident to its restoring motion, always the same spacing from the annular member 5 and therefore also from the contacts 3″ lying thereupon in the storage position.

The next successive current impulses acting upon the magnet A are in similar manner used for the return motion of the scanning wiper 11 and are similarly transmitted to the concerned switching devices. As shown in Fig. 6, there are upon the back side of the annular member 5, between the storage contact finger 3″ in the normal position of the switching device and the next contact finger which has been brought into storage position, three contacts. This means that the switching device, which has absorbed four impulses, must transmit these impulses because the scanning wiper 11 (as may be seen from Fig. 6) will reach the next contact finger which is in storage position only after the fourth current impulse. A point in a suitable and known circuit is in this position completed for affecting a suitable relay device which operates to inhibit further actuation of the magnet A. This magnet receives additional current impulses after a certain time, and the scanning wiper is consequently stepped to the next contact finger which has been brought into storage position. The corresponding impulses are, as before, likewise transmitted to the switching apparatus which has to be operated thereby.

As shown in Fig. 6, there are on the back side of the annular guide member 5 six contact fingers between the storage contact finger (radially aligned with the control contact III) which has been reached by the scanning wiper 11 and the next successive contact finger disposed in storage position. The scanning wiper therefore will reach the last contact finger 3″ (in storage position) after executing seven steps in response to seven further impulses delivered to the magnet A. The actuating nipple of the current-supply spring 21 slides in this position into a cutout in the current-supply segment 22, thus resulting in switching over of the contact 15 and thereby, over suitable and known circuit means, giving a signal which signifies that all digits stored by the device have been properly re-transmitted.

Figure 10:
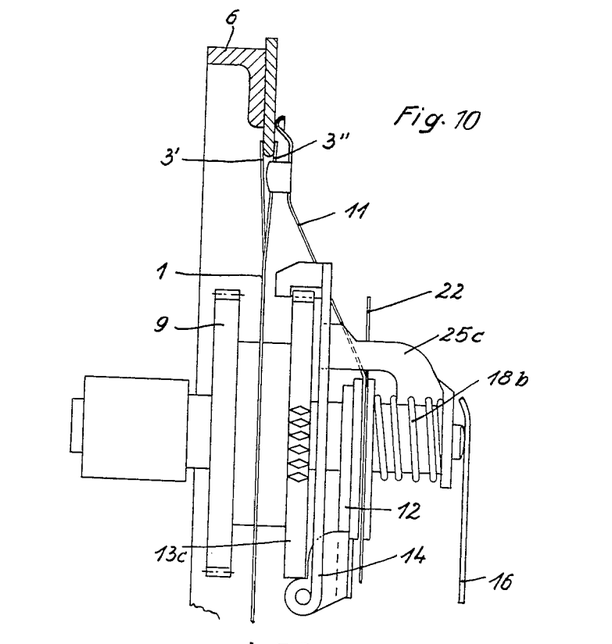
Figs. 10 and 11 are two views of another form of the stepping pawl or the scanning wiper, Fig. 10 showing the scanning wiper in front view and Fig. 11 showing it in plan view.
Figure 11:
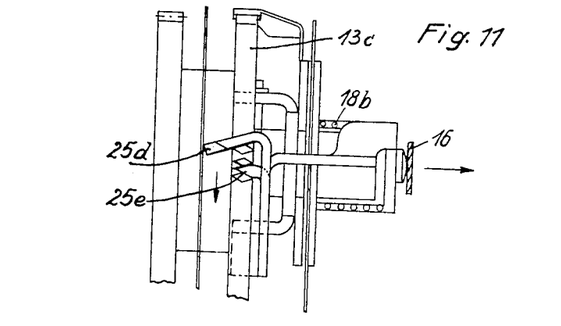

Figs. 10 and 11 show modified details of parts for effecting the return motion of the scanning wiper 11, which eliminate the necessity of using a special spring for producing the rotation of the pawl 25c. The detent gear wheel 13c is provided with diamond-shaped teeth. The pawl 25c moves incident to its axial displacement with the arms 25d and 25e alternately along the obliquely cut teeth of the wheel 13c, thereby causing the pawl 25c to move in the direction of the arrow shown in Fig. 11.

This motion is transmitted to the scanning wiper 11 through the medium of the lever 14 and the carrier 12 in similar manner as explained with reference to the embodiment illustrated in Figs. 6–9. Only a simple spring 18b is required to furnish the power for moving the pawl 25c.

Figure 12:
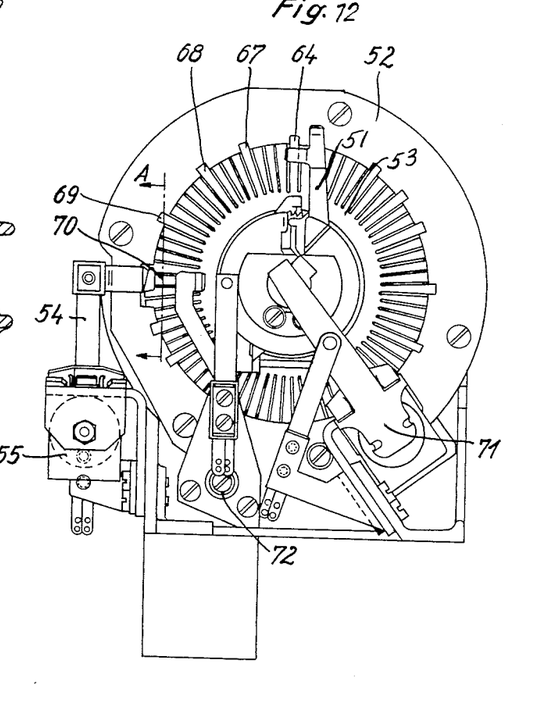
Fig. 12 represents a further embodiment of the switching device from the side thereof on which is disposed the scanning wiper.
Figures 13, 14:
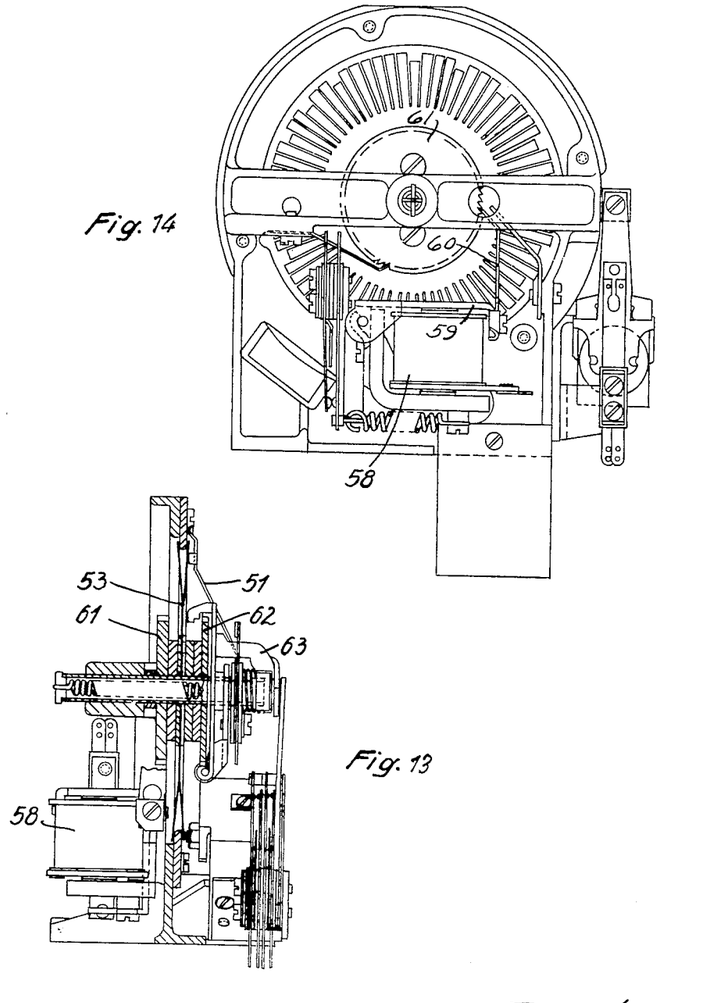
Fig. 13 shows a section of the device of Fig. 12.
Fig. 14 indicates the device of Figs. 12 and 13 from the storage contact side.
Figure 15:
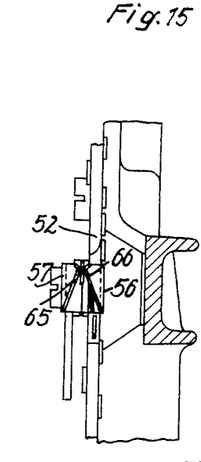
Fig. 15 shows, on an enlarged scale, a sectional view taken along the line A—B of Fig. 12.

In the embodiment according to Figs. 12–15, the scanning wiper 51 glides with its outer end upon the annular guide member 52, which determines the positioning of the storage contact fingers extending from the disk 53. The armature 54 of the magnet 55, which controls the switching of the contact fingers from the resting side of the annular member 52 to the storage side thereof, is in this embodiment also provided with glide or guide surfaces 56/57. One of these glide surfaces (56) engages the frontal side of the annular member 52 in the resting position of the magnet 55, as shown in Fig. 12, while the other glide surface (57) engages the rear side of the annular member 52 in the actuated position of the armature 54.

The device according to Figs. 12–15 operates as an impulse repeater and is for this purpose provided with a magnet 58 which receives the impulse series and sets the device accordingly. The magnet 58 actuates, responsive to the receipt of the impulses, the armature 59 with its pawl 60 to rotate the gear wheel 61, thereby also rotating the contact disk 53, the pawl wheel 62, the stepping pawl 63 and the scanning wiper 51. The contact finger 64 remains in storage position at the beginning of the rotation of the contact disk 53. The other contact fingers are moved by the armature guides 65/66 (Fig. 15) to the resting side of the annular guide member 52. The magnet 55 is switched in at the conclusion of the delivered impulse series. The armature 54 engages the annular member 52 with its guide surface 56 so that the contact finger which is disposed between the guides 65/66 is switched over to the storage side. This operation secures the uniform motion of the contact fingers along the two sides of the annular member 52.

The setting of the device is repeated responsive to the receipt of the next successive impulse series by the magnet 58.

According to Fig. 12, the contact fingers 67, 68 and 69 are in storage position, in addition to the contact finger 64, while the contact finger 70 is just about to move into the storage position. Between the individual contact fingers 64 and 67–70 are successively three, three, four and again four contact fingers in the resting position. This means that the device has successively stored the digits "4," "4," "5" and again "5."

The magnet 71 will receive current impulses so as to initiate the transmission of the stored impulse series. These current impulses are, as before, transmitted by suitable means to an associated switching device (not shown), and the return motion of the scanning wiper 51 is coincidentally carried out. The control of the scanning wiper 51 by the pawl 53 takes place in the same manner as described in connection with the switching device shown in Figs. 6–9. When the scanning wiper 51 leaves the storage contact finger 64, the outer end thereof will slide along the annular guide member 52 until the contact portion of the wiper reaches the next contact finger 67. Upon sliding onto the contact finger 67, the scanning wiper will be lifted off from the annular guide member 52. The amount of lift of the scanning wiper 51 incident to running upon the contact finger 67 will always be the same, even if the position of the annular guide member 52 varies in axial direction, because the outer end of the scanning wiper 51 always slides upon the surface of the annular guide member 52, and the contact finger in storage position is likewise resting against the surface of the annular guide member 52. When the scanning wiper 51 reaches the contact finger 67, there will result a testing circuit, including the scanning wiper 51 and the contact finger 67, and the impulsing to the magnet 71 will be temporarily interrupted. The impulsing to the magnet 71 is, after a short pause, continued and the next successive series of impulses is thus transmitted to the concerned switching devices, and the scanning wiper 51 is stepped further until it reaches the contact finger 68 which is in storage position. The testing circuit then again takes effect, and the further motion of the scanning wiper 51 is stopped, as before. This return stepping of the scanning wiper is continued until the switching device reaches the normal position which is signified by the switching over of the contact 72. As mentioned before in connection with the description of the corresponding operations of other embodiments, the circuit means for the switching operations described herein may be suitable and known means, and therefore have been omitted.

The annular guide member 52 of the switching device according to Figs. 12–15 therefore determines at any point of its circumference a corresponding proper position of the contact fingers. Since the scanning wiper 51 is in any of its positions also in engagement with the annular guide member 52, the lift of the scanning wiper incident to moving into engagement with a contact finger in storage position will always be the same. No particular adjustment of the parts is required to obtain the proper operation.

We claim:

1. Impulse-storing switching device comprising a shaft, a generally circularly-shaped member rotatable about the axis of said shaft, a set of radially extending contact fingers carried by said member, means for disposing said contact fingers for rotation on and about said shaft, a fixedly disposed annular guide member positioned in concentric arrangement with respect to said rotatable member, a cutout formed in said annular guide member through which end portions of said fingers may pass whereby contact fingers corresponding to unselected impulses may be disposed on one side of said annular guide member and contact fingers corresponding to selected impulses may be disposed in storage position on the other side of said annular guide member, means for effecting disposition of the respective fingers to a selected side of said annular guide member when such finger is in alignment with said cutout, means for sequentially positioning said fingers in alignment with said cutout in response to incoming impulses and a takeoff switching device including a scanning wiper for establishing connection with any contact finger in storage position to complete a test circuit signifying the end of an impulse series.

2. The device as defined in claim 1, together with an impulse-responsive stepping magnet for stepping said contact fingers into storage position in accordance with digits to be stored.

3. The device as defined in claim 1, together with a control magnet comprising an armature for placing said contact fingers into storage position.

4. The device as defined in claim 1, wherein said annular member forms guide surfaces along which said contact fingers glide into and out of storage position in alignment with said cutout.

5. The device as defined in claim 1, wherein said annular member forms guide surfaces along which said contact fingers glide into and out of storage position in alignment with said cutout, and a control magnet comprising an armature for actuating into storage position any contact finger aligned with said cutout.

6. The device as defined in claim 1, together with means effective responsive to the setting of said scanning wiper upon a contact finger in storage position for completing a testing circuit including relay means to determine the end of the corresponding impulse series.

7. The device as defined in claim 1, together with current supply means for said scanning wiper comprising a switching arm and a segmental switching member, and means effective responsive to the setting of said scanning wiper upon a contact finger in storage position for completing a testing circuit including relay means to determine the end of the corresponding impulse series.

8. The device as defined in claim 1, together with stepping means for restoring said scanning wiper to normal position, said scanning wiper during its restoring motion contacting only the contact fingers which are in storage position.

9. The device as defined in claim 1, together with stepping means for actuating said contact fingers and said scanning wiper, a restoring spring for said scanning wiper, said restoring spring being tensioned during the stepping of said scanning wiper and said contact fingers, and a control magnet for releasing said restoring spring to govern the return motion of said scanning wiper.

10. The device as defined in claim 1, together with stepping means for actuating said contact fingers and said scanning wiper, a restoring spring for said scanning wiper, said restoring spring being tensioned during the stepping of said scanning wiper and said contact fingers, a control magnet, circuit means for transmitting impulses to said control magnet, means governed by said control magnet for releasing said restoring spring to govern the restoration of said scanning wiper, the impulses acting upon said control magnet also acting upon switching means controlled by said switching device.

11. The device as defined in claim 1, together with stepping means for actuating said contact fingers and said scanning wiper, a retoring spring for said scanning wiper, said restoring spring being tensioned during the stepping of said scanning wiper and said contact fingers, a control magnet for releasing said restoring spring to govern the return motion of said scanning wiper, and interrupter means for generating impulses which affect said control magnet.

12. The device as defined in claim 1, together with actuating means for said scanning wiper, said actuating means being operative as a coupling for the operation of said contact fingers.

13. The device as defined in claim 1, together with actuating means for said scanning wiper, and a control magnet having an armature which is adapted to affect said actuating means in any angular position of said scanning wiper.

14. The device as defined in claim 1, together with actuating means for said scanning wiper, and a control magnet having an armature which is adapted to affect said actuating means in any angular position of said scanning wiper, the free end of said armature being funnel-shaped and disposed concentric with said shaft.

15. The device as defined in claim 1, together with actuating means for said scanning wiper, and a control magnet having an armature which is adapted to affect said actuating means in any angular position of said scanning wiper, the free end of said armature being funnel-shaped and disposed concentric with said shaft, said funnel-shaped end of said armature operating said actuating means responsive to displacement of said armature in either direction.

16. The device as defined in claim 1, together with stepping means for restoring said scanning wiper from any actuated position comprising a gear wheel, a double-armed lever forming pawls for operating said gear wheel, an oscillating lever for operating said double-armed lever, and a control magnet for actuating said oscillating lever.

17. The device as defined in claim 1, together with a device for restoring said scanning wiper from any advanced position, a restoring spring, said restoring spring being tensioned incident to the setting of said contact fingers, a switching arm and a double-armed lever carried thereby, a control magnet having an armature, said armature being upon each attraction and following restoration effective to cause said restoring spring to move said switching arm and said double-armed lever by an increment corresponding to the angular device between two storage contacts, and a gear wheel affected by said double-armed lever to move said scanning wiper correspondingly.

18. The device as defined in claim 1, together with a control magnet, an impulse circuit means for interrupting said control magnet upon contacting of a contact finger in storage position by said scanning wiper.

19. The device as defined in claim 1, together with a magnet for controlling the step-by-step restoring motion of said scanning wiper, a stepping pawl, a detent gear wheel, said stepping pawl being actuated in the direction of said shaft to operate said gear wheel, and a detent member disposed axially of said shaft and extending between the armature of said magnet and said stepping pawl.

20. The device as defined in claim 1, together with a magnet for controlling the step-by-step restoring motion of said scanning wiper, a stepping pawl, a detent gear wheel, a carrier for rotatably journalling said stepping pawl at a point remote from the axis of said shaft, said stepping pawl being actuated in the direction of said shaft to operate said gear wheel, and a detent member disposed axially of said shaft and extending between the armature of said magnet and said stepping pawl.

21. The device as defined in claim 1, together with a magnet for controlling the step-by-step restoring motion of said scanning wiper, a stepping pawl, a carrier for rotatably journalling said stepping pawl at a point remote from the axis of said shaft, and means for rotatably journalling said carrier on said shaft to operate said gear wheel, and a detent member disposed axially of said shaft and extending between the armature of said magnet and said stepping pawl.

22. The device as defined in claim 1, together with a magnet for controlling the step-by-step restoring motion of said scanning wiper, a stepping pawl, a carrier for rotatably journalling said stepping pawl at a point remote from the axis of said shaft, means for rotatably journalling said carrier on said shaft to operate said gear wheel, a detent member disposed axially of said shaft and extending between the armature of said magnet and said stepping pawl, and means for securing on said carrier said scanning wiper and a current-supply terminal therefor.

23. The device as defined in claim 22, together with a restoring spring for said stepping pawl.

24. The device as defined in claim 1, comprising a mechanism for controlling the operation of said scanning wiper including a pawl, a spring engaging said pawl, and a tubular shaft for encasing said spring.

25. The device as defined in claim 1, comprising a mechanism for controlling the operation of said scanning wiper, said mechanism including a pawl, a magnet having an armature for operating said pawl, each attraction and following restoration of said armature causing said scanning wiper to move by one half-step.

26. The device defined in claim 25, comprising a gear wheel, guide surfaces being formed on said pawl for controlling the actuation of said gear wheel to operate said scanning wiper.

27. The device defined in claim 25, comprising a gear wheel having obliquely cut teeth, and a pair of extensions projecting from said pawl for actuating said gear wheel to operate said scanning wiper.

28. The device defined in claim 25, comprising a gear wheel having obliquely cut teeth, and a pair of extensions projecting from said pawl for actuating said gear wheel to operate said scanning wiper, each actuation of said pawl being effective to rotate said scanning wiper and said pawl by one half-step.

29. The device defined in claim 1, comprising means extending from said scanning wiper and forming a guide member for sliding engagement with said annular guide member.

30. The device defined in claim 1, wherein said annular guide member is formed of insulating material.

31. The device defined in claim 1, comprising an impulse-responsive magnet having an armature for rotating said contact fingers to dispose predetermined fingers in storage position, said armature being in at least one position thereof in engagement with said annular member.

32. The device defined in claim 1, comprising an impulse-responsive magnet having an armature, and guide means on said armature for guiding said contact fingers into storage position.

33. A device for receiving series of impulses for storage therein and for re-transmitting such impulse series comprising a flat relatively stationary annular member, a cut-out formed in said member, a disk carrying resilient contact fingers radially extending therefrom peripherally thereof, said contact fingers being normally disposed on one side of said annular member in engagement with the corresponding surface thereof, impulse-responsive means for receiving successive series of impulses to rotate said disk for the purpose of successively disposing predetermined contact fingers in alignment with the cutout in said annular member, means operated when a contact finger is placed in alignment with said cutout to flex such contact finger for causing it to move through said cutout to the opposite side of said annular member and to ride along the surface of said opposite side incident to the successive actuation of said impulse-responsive means, whereby predetermined contact fingers are disposed in storage position on the other side of said annular member, a scanning wiper rotated coincident with the rotation of said disk, and impulse-actuated means for thereafter rotating said scanning wiper in reverse direction to re-transmit series of impulses in accordance with the setting of said contact fingers in said storage position.

34. The device defined in claim 33, wherein said impulse-actuated means comprises an escapementlike pawl, and a gear wheel actuated by said pawl to rotate said scanning wiper.

35. The device defined in claim 33, wherein said impulse-actuated means comprises a lever having two pawl members, and a gear wheel actuated by said pawl members to rotate said scanning wiper, each pawl member being operatively effective during each operation of said lever in either direction.

36. The device defined in claim 33, wherein said impulse-actuated means comprises a lever having two pawl members, and a gear wheel having obliquely cut teeth which are engaged by said pawl members to rotate said scanning wiper.

37. The device defined in claim 33, comprising means for delivering impulse series to said impulse-responsive means for setting said contact fingers in storage position, local impulse means for producing impulses for delivery to said impulse-actuated means to rotate said scanning wiper in reverse direction, circuit means for interrupting the operation of said local impulse means whenever said scanning wiper reaches a contact finger in storage position thereof, and circuit means for re-transmitting the corresponding impulse series under the control of said scanning wiper.

38. An impulse storing device comprising a pair of cooperable generally concentrically arranged members, one of which is relatively fixed and the other of which is rotatable relative to the fixed member, one of said members having radially extending contact fingers, each operatively connected at one end to such member, the free ends of said contact fingers being positioned opposite the other member and constructed for movement to either side of said last mentioned member, with the latter operative to prevent undesired movement of said fingers from one side to the other thereof, one side of such member constituting a storage position of said fingers, means for sequentially segregating the free ends of desired fingers at opposite sides of such member in predetermined relation to the impulses to be stored, and takeoff means cooperable with fingers disposed in storage position for imparting the relation of the impulses so stored.

39. An impulse storing device comprising a pair of cooperable generally concentrically arranged members, one of which is relatively fixed and the other of which is rotatable relative to the fixed member, one of said members having radially extending resilient contact fingers, each operatively connected at one end to such member, the free ends of said contact fingers being positioned opposite the other member and constructed for flexing movement to either side of said last mentioned member, with the latter operative to prevent undesired movement of said fingers from one side to the other thereof, one side of such member constituting a storage position of said fingers, said last mentioned member having a cutout therein through which a finger aligned therewith may pass from one side thereof to the other, means located adjacent said cutout selectively engageable with the free end of a finger aligned with said cutout operable to move such end to a selected side of such member, means for effecting rotational movement of the rotatable member whereby successive fingers may be aligned with said cutout and takeoff means sequentially cooperable with fingers disposed in storage position for imparting the relation of the impulses so stored.

References Cited in the file of this patent

UNITED STATES PATENTS

| | | |
|---|---|---|
| 2,322,848 | Hibbard | June 29, 1943 |
| 2,445,829 | Henrikson | July 27, 1948 |
| 2,606,244 | Johnson et al. | Aug. 5, 1952 |